Nov. 4, 1958     F. W. STEIN     2,858,963
TEST CELL LOADING DEVICE
Filed June 17, 1955
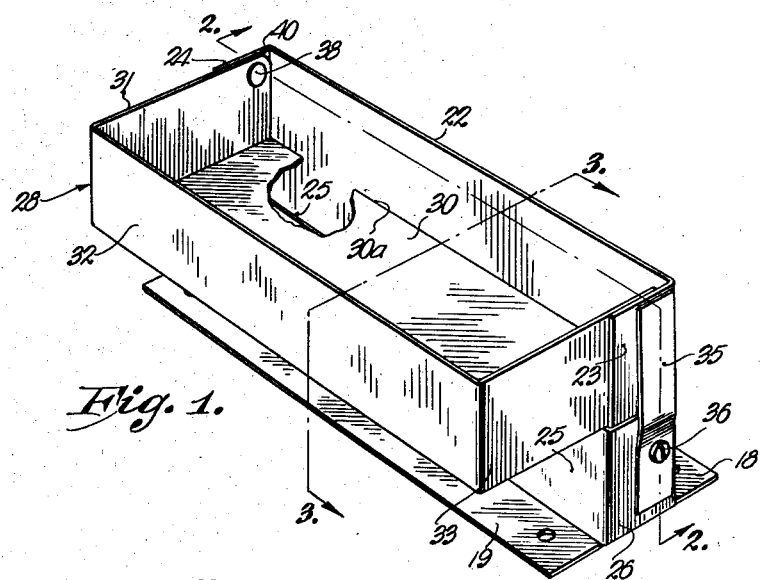
Fig. 1.
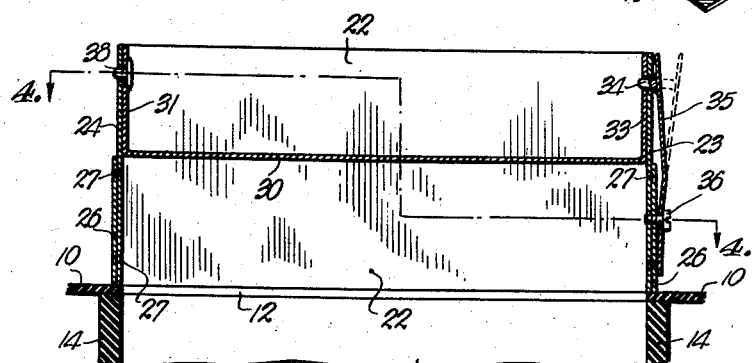
Fig. 2.
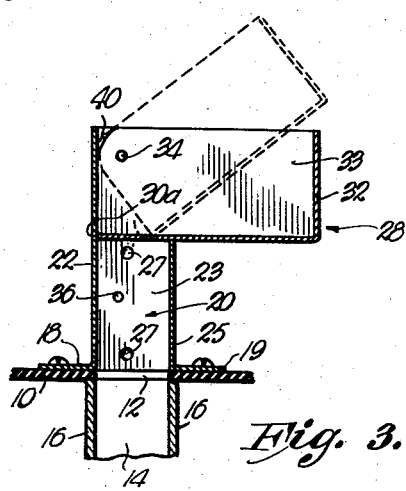
Fig. 3.
Fig. 4.
INVENTOR.
Frederick W. Stein
BY
ATTORNEY.

United States Patent Office 2,858,963
Patented Nov. 4, 1958

2,858,963

TEST CELL LOADING DEVICE

Frederick W. Stein, Atchison, Kans.

Application June 17, 1955, Serial No. 516,196

8 Claims. (Cl. 222—166)

The present invention relates in general to loading devices for test cells and it involves an improvement upon the type of loading device shown in my prior Patent No. 2,251,641, granted August 5, 1941.

In my prior patent I disclosed apparatus for performing an electrical test on fluent materials such as corn, wheat, flour and the like, which apparatus employs an open top generally rectangular cell for receiving the test specimen. The cell resembles a rather tall box which is thin in one horizontal direction and elongated in the other whereby the top opening is long and narrow; the vertical walls extending downwardly from opposite sides of the narrow opening are in whole or in part electrodes which are utilized in testing the fluent material introduced into the space therebetween.

In order to obtain reliable and accurate test results with a cell of this kind, the charging thereof is important. To begin with, the volume of test material used should always be the same in one test as it is in another, and the material should be so deposited that its depth in the cell is uniform without hills, valleys or other surface irregularities; moreover, for obvious reasons, the specimen should not be more compressed or compacted in one region than in another.

The object of the present invention, broadly speaking, is to provide a cell-loading device which makes it possible to charge the cell in such manner as will fully satisfy these conditions and requirements. More particularly, it is my aim to provide a device for quickly and easily measuring a predetermined volume of fluent test material and transferring it into the test cell in such fashion as to produce the desired uniformity of distribution of the sample in the cell.

Sometimes it may be desirable to use a certain volume of test material in one class of test and to use a different volume in another class; and a further object of my invention is to provide a loading device which can easily be modified to deliver the desired volume to the test cell in any instance.

Still another object is to provide a measuring and loading device of the character indicated which is exceedingly simple in construction and economical to manufacture; which is reliable and foolproof in operation; which is not subject to damage and requires little maintenance; and which is easy to install, easy to use and simple to disassemble for cleaning. A further object is to provide a loading and measuring device which is compact and requires little space.

Yet another object is to provide a measuring hopper which normally closes the entrance of the test cell but is displaceable to open same and simultaneously discharge a load into the cell; said hopper automatically being self-restoring to reclose the entrance and permit immediate reloading of the hopper while a test of previously discharged material is in progress. In this connection, a feature of the invention resides in so designing the movable hopper as to make accidental discharge of test material into the cell virtually impossible, this being accomplished very simply without the aid of any auxiliary latching means or biasing springs.

Other and further objects of the invention, together with the features of novelty whereby the objects are achieved will appear in the course of the following description.

In the drawings which are to be read in conjunction with the specification and in which like numerals are used to indicate like parts in the various views:

Fig. 1 is a perspective view of my improved measuring and loading device;

Fig. 2 is a vertical cross section of the device taken along the plane 2—2 of Fig. 1 in the direction of the arrows;

Fig. 3 is a vertical transverse cross section of the device taken along the plane 3—3 of Fig. 1 in the direction of the arrows; and Fig. 4 is a horizontal cross section taken along the line 4—4 of Fig. 2 in the direction of the arrows.

Referring more particularly to the drawings, the numeral 10 indicates the horizontal panel of a testing unit of the general type shown in my prior patent; the panel preferably is made of insulating material and has an elongate rectangular opening 12 therein. The test cell extends downwardly from this opening, having end walls 14 made of insulating material and side walls 16 made in whole or in part of metal to form the opposite electrodes to which the test circuit is connected.

My loading device is supported on the upper face of the panel by means of outwardly projecting horizontal flanges 18 and 19 which may be fastened to the panel on either side of the opening 12 as shown in Fig. 3. The device has a vertical chute or hollow column which forms a passageway 20 extending upwardly from the supporting flanges, the cross section of the passageway matching the shape of the opening 12 so that when positioned in register therewith as illustrated, the walls of the chute are in effect coplanar extensions of the corresponding walls of the test cell.

The side wall 22 of the chute and the two end walls 23, 24 are of equal height; they and the horizontal flange 18 conveniently are made from a single piece of sheet metal bent to the shape shown in the drawings. The remaining side wall 25 of the chute is substantially lower than the opposite side wall 22 and conveniently is made as a separate part integral with the horizontal flange 19 and having a pair of integral vertical flanges 26 overlaying the lower portions of the end walls 23. The latter are spot-welded together as shown at 27 or otherwise secured to form a rigid unitary chute assembly.

Between the upper portions of the end walls 23 and pivoted thereto is a three-sided open-top hopper 28 having a bottom 30 and upstanding walls 31, 32 and 33. Wall 33 of the hopper and wall 23 of the chute have registering apertures in which is received a pivot pin 34, the latter being carried at the upper end of a leaf spring 35 whose lower end is secured to the exterior of the chute by a screw 36. Opposite pivot pin 34, wall 31 of the hopper carries a fixed pin 38 projecting outwardly into a registering hole in the end wall 24 of the chute.

The two pivots permit upward tilting of the hopper as illustrated by dotted lines in Fig. 3, but normally the hopper occupies the horizontal position shown in solid lines. When in normal position, it will be noted that the bottom of the hopper serves as a gate closing the upper end of chute 20 and that its entire edge 30a seats against the wall 22 of the chute; the upper edges of walls 22, 23, 24, 31, 32 and 33 now are flush and the upper portion of wall 22 in effect forms the fourth side of the hopper.

In using my device it is only necessary to fill the hopper full of the material to be tested (let us say, wheat or flour) and level it by running a ruler or other straight edge along the upper edges of the hopper walls. As will be clear from Fig. 3, the center of gravity of the hopper is so located relative to the pivots that the weight of the hopper tends always to swing it to closed position; and the addition of material thereto only increases this set tendency so there is no danger of the test material leaking or accidentally spilling into the chute during the filling of the hopper and leveling of the material therein. When this has been done, the operator merely lifts the outer edge of the hopper by hand which tilts the bottom thereof and draws its edge 30a away from the wall 22 as shown in dotted lines in Fig. 3 to cause the hopper contents to discharge through the chute 20 into the test cell. The discharge obviously is simultaneous and equal at all points along the length of the cell since the material already has been distributed uniformly from end to end thereof while in the hopper. Accordingly, it enters the cell in a manner which automatically forms a perfectly level bed in the bottom thereof.

The dotted showing of the hopper in Fig. 3 represents its upper limit of travel, and it will be noted that in this position the edge 30a still projects a slight distance over wall 25 in order to insure that all of the material is discharged into the chute, there being however an opening between the hopper bottom 30 and the upper edge of this wall through which air can escape to permit entry of the material with a minimum of turbulence. To halt upward tilting of the hopper in this position, the corner of each end wall (31, 33) is rounded in a manner which provides a radius 40 which is eccentric to the pivotal axis; the curved edges are arranged to come into smooth wedging engagement with a chute wall 22 and to halt the movement of the hopper in the upper limit position. Lateral spilling of the material as it is discharged from the hopper is prevented by the upper portions of the chute walls 23 and 24.

Referring to Figs. 1 and 2, hopper 28 can be removed from the chute by manually withdrawing spring 35 (see dotted line position in Fig. 2) in order to remove pivot pin 34; the adjoining end of the hopper then can be lifted from place after which pivot pin 38 on the opposite hopper wall is easily withdrawn from its supporting aperture in wall 24 of the chute. Removal of the hopper in this fashion is useful not only for cleaning purposes but also in some cases to afford an unobstructed vertical passageway through the chute 20 into the opening of the test cell; thus, if the test procedure requires the material in the test cell to be somewhat compressed, a rectangular plunger suitably weighted can be inserted, or a tamping device can be used as described in my prior patent without removal of the chute assembly.

If test procedures require the use of different volumes of material for different tests, interchangeable hoppers, all having the same dimensions between walls 31 and 33 but differing from one another in horizontal width, can be employed. Insertion of any one of the hoppers in the chute assembly as described automatically predetermines the volume of material that will be discharged into the cell upon tilting of the hopper. The construction obviously permits the different hoppers to be interchanged easily and quickly for this purpose.

From the foregoing it will be seen that my invention is one well adapted to attain all of the ends and objects hereinbefore set forth, together with other advantages which are obvious and which are inherent to the apparatus.

It will be understood that certain features and subcombinations are of utility and may be employed without reference to other features and subcombinations. This is contemplated by and is within the scope of the appended claims.

Inasmuch as many possible embodiments of the invention may be made without departing from the scope thereof, it is to be understood that all matter herein set forth or shown in the accompanying drawings is to be interpreted as illustrative and not in a limiting sense.

Having thus described my invention, I claim:

1. In a device of the character described, an open-top hopper having a closed bottom, said hopper being closed on three sides but open on the fourth side, means pivotally supporting said hopper to tilt about a generally horizontal axis, said axis being spaced above the bottom of the hopper and located adjacent to the open side thereof whereby the center of gravity of said hopper is offset laterally from said axis, a stationary abutment against which the open edge of the hopper bottom normally bears under the influence of gravity, a vertical chute comprising a hollow column open at its upper end, the open upper end of said column being positioned directly below, and covered by, said bottom of the hopper when said edge thereof bears against said abutment, and said abutment comprising a wall contiguous with and forming an upward extension of one side of said column, said wall normally confronting and completely covering the open side of said hopper to close same.

2. A device as in claim 1 in which said wall comprises means limiting the amount which the hopper can be tilted from the position it normally assumes under the influence of gravity.

3. In a device of the character described, a generally vertical chute comprising a fixedly positioned hollow column open at its upper end, said column having opposite side walls which at the upper end of the column terminate at different levels, a generally horizontal gate spaced below the level of the higher one of said side walls and extending over the lower side wall with a portion of the gate normally covering the open upper end of the column and another portion projecting laterally of the column beyond said lower side wall, means pivotally supporting said gate to turn about a horizontal axis spaced above the gate and located close to said higher side wall whereby the weight of said gate urges one edge thereof normally into seating engagement with said higher side wall, and said gate having around a portion of its margin upstanding walls forming with the upper portion of said higher wall an open-top hopper.

4. In a device of the character described, a hopper having a generally rectangular bottom with integral upstanding walls on three sides thereof, a stationary vertical wall confronting the fourth side thereof, means swingably supporting the hopper on said stationary wall to tilt about an axis parallel to said stationary wall and closely adjacent thereto, said axis being below the top of said stationary wall but above the bottom of said hopper, a vertical chute of generally rectangular cross section below the hopper and normally covered by the bottom thereof, said stationary wall comprising an upward extension of one wall of said chute.

5. In a device of the character described, an open-top hopper having a bottom with upstanding walls on three sides thereof whereby said hopper is open on the fourth side, a stationary upstanding plate normally closing the fourth side of said hopper, said plate having integral flanges overlying portions of the two walls of said hopper which are adjacent to the open side thereof; means swingably supporting the hopper on said flanges to tilt about a generally horizontal axis parallel to said plate and closely adjacent same, said means comprising a pivot pin through each flange and the hopper wall which that flange overlies, a chute having four vertical walls completely enclosing a chute passageway which is open at the top, said top opening of the passageway being positioned directly below said hopper and normally covered by the bottom thereof, said plate and said flanges comprising upwardly projecting extensions of three walls of said chute, and the fourth wall of said chute having its upper edge confronting the underside of the bottom of said hopper.

6. A device as in claim 5 wherein said pivot pins are removable to permit said hopper to be withdrawn from between said flanges.

7. In a device of the character described, a stationary housing having upright walls completely enclosing a vertical passageway which is open at its upper end, said housing also having a stationary closure member contiguous with and forming an upward extension of one wall of said passageway, a hopper for dumping material into the open upper end of said passageway, said hopper comprising a tray having a bottom with integral upstanding walls on three sides thereof whereby said tray is open on the fourth side, means swingably supporting said tray on said housing to move between a loading position wherein the bottom of said tray is horizontal and a dumping position wherein the bottom of said tray is inclined downwardly toward the open side thereof with the latter side in material-delivering relation to the open upper end of said passageway, said open upper end of the passageway being directly below, and covered by, the bottom of said tray when the latter is in said horizontal loading position, and said open side of the tray confronting and seating against said closure member when the tray is in loading position to prevent material in the tray from passing therefrom into said passageway.

8. In a device of the character described, an open-top hopper having a bottom with upstanding walls on three sides thereof whereby said hopper is open on the fourth side, a stationary upstanding plate normally closing the fourth side of said hopper, said plate having integral flanges overlying portions of the two walls of said hopper which are adjacent to the open side thereof, means swingably supporting the hopper on said flanges to tilt about a generally horizontal axis parallel to said plate and closely adjacent same, said means comprising a pivot pin through each flange and the hopper wall which that flange overlies, at least one of said pins being normally disposed in registering holes in one of said flanges and the hopper wall that the flange overlies, said pin being carried on the free end of a spring whose other end is secured to said chute, a vertical chute below said hopper and normally covered by the bottom thereof, said plate and flanges comprising upwardly projecting extensions of three walls of said chute, and the fourth wall of said chute having its upper edge confronting the underside of the bottom of said hopper.

References Cited in the file of this patent
UNITED STATES PATENTS

| | | |
|---|---|---|
| 364,316 | Stacy | June 7, 1887 |
| 523,982 | Hannan | Aug. 7, 1894 |
| 2,512,549 | La Riviere | June 20, 1950 |